United States Patent
Chesney et al.

(10) Patent No.: US 7,890,385 B1
(45) Date of Patent: Feb. 15, 2011

(54) METHOD, MEDIUM, AND SYSTEM FOR WHOLE PRODUCT GAP ANALYSIS

(75) Inventors: Simon O. Chesney, Livermore, CA (US); Victoria Richard, East Palo Alto, CA (US); Bridget Warwick, Saratoga, CA (US)

(73) Assignee: NetApp. Inc., Sunnyvale, CA (US)

( * ) Notice: Subject to any disclaimer, the term of this patent is extended or adjusted under 35 U.S.C. 154(b) by 1336 days.

(21) Appl. No.: 11/373,737

(22) Filed: Mar. 9, 2006

(51) Int. Cl.
*G06Q 30/00* (2006.01)

(52) U.S. Cl. .............................. 705/26.1; 705/7; 705/8; 705/9

(58) Field of Classification Search .................... 705/26, 705/27, 7, 8, 9, 10
See application file for complete search history.

(56) References Cited

U.S. PATENT DOCUMENTS

| | | | | |
|---|---|---|---|---|
| 5,864,480 | A * | 1/1999 | Ladd | 700/83 |
| 6,006,195 | A * | 12/1999 | Marchak et al. | 705/9 |
| 6,256,773 | B1 * | 7/2001 | Bowman-Amuah | 717/121 |
| 6,714,915 | B1 * | 3/2004 | Barnard et al. | 705/7 |
| 7,302,429 | B1 * | 11/2007 | Wanker | 1/1 |
| 7,346,526 | B2 * | 3/2008 | Daughtrey et al. | 705/5 |
| 2002/0120490 | A1 * | 8/2002 | Gajewski et al. | 705/10 |
| 2003/0018511 | A1 * | 1/2003 | Bicknell et al. | 705/9 |
| 2003/0033191 | A1 * | 2/2003 | Davies et al. | 705/10 |
| 2003/0093310 | A1 * | 5/2003 | Macrae | 705/8 |
| 2003/0144911 | A1 * | 7/2003 | Lin-Hendel | 705/26 |
| 2003/0225470 | A1 * | 12/2003 | Demetriou et al. | 700/100 |
| 2004/0064358 | A1 * | 4/2004 | Hill et al. | 705/10 |
| 2004/0078257 | A1 * | 4/2004 | Schweitzer et al. | 705/9 |
| 2004/0122853 | A1 * | 6/2004 | Moore | 707/103 R |
| 2004/0267595 | A1 * | 12/2004 | Woodings et al. | 705/9 |
| 2005/0033736 | A1 * | 2/2005 | Carlin et al. | 707/3 |
| 2005/0256844 | A1 * | 11/2005 | Cristol | 707/2 |
| 2006/0004616 | A1 * | 1/2006 | Yamashita et al. | 705/7 |
| 2006/0111953 | A1 * | 5/2006 | Setya | 705/8 |
| 2006/0143219 | A1 * | 6/2006 | Smith et al. | 707/102 |
| 2006/0173726 | A1 * | 8/2006 | Hall et al. | 705/8 |
| 2007/0050198 | A1 * | 3/2007 | Ledford et al. | 705/1 |

OTHER PUBLICATIONS

R. Sudarsan, S.J. Fenves, R.D. Sriram, F. Wang, A product information modeling framework for product lifecycle management, Computer-Aided Design, vol. 37, Issue 13, Nov. 2005, pp. 1399-1411, ISSN 0010-4485, DOI: 10.1016/j.cad.2005.02.010.*

* cited by examiner

*Primary Examiner*—Yogesh C Garg
*Assistant Examiner*—Matthew Zimmerman
(74) *Attorney, Agent, or Firm*—Perkins Coie LLP

(57) ABSTRACT

A whole product gap analysis tool assists a user in a business enterprise in identifying deliverables, functional responsibilities and owners, that are required in providing a whole product to a customer. The tool implements a method that includes indicating to a user items that are potentially required for providing a whole product associated with a generic product. The method further includes enabling the user to provide input specifying whether each of the items is required for providing the whole product, and in response to that input, for each item specified as required for providing the whole product, automatically identifying and indicating to the user a deliverable for the item and a person responsible for delivering the deliverable.

29 Claims, 11 Drawing Sheets

Whole Product Gap Analysis Checklist vs. 1.0.4 (10/26/2005)

*(Instructions for use)*

This page is the "Configuration Tab"

1 Input Name & Version for product/feature/solution (as appropriate)
Select product/release vehicle type

| Product Name & Version | SnapWidget Version 2.1 |
|---|---|
| ONTAP Classic | Yes |
| ONTAP NG | No |
| Platform | No |
| Other software | No |
| Other hardware | Yes |

Name the product & version, identify technology type(s). Selections here highlight certain items on the checklist tab.

FIG. 2A

2 Select Product Phase.
Choose the next Phase Review. For products, features or services not going through the formal Phase Review process, choose as follows: 0/1=proposal; 2=planning; 3=development; 4/5=ship readiness; 6/7=shipping.

| Product Phase | 3 |
|---|---|

Product Phase - determines expected deliverable type (e.g. specification, plan, implementation) and default functional owner (e.g. product management, development, services etc) for checklist items.

3 Select Product Maturity (Mature/Immature)
Immature product (ie. "version 1.0") may lack features or have other specific limitations; choosing Immature will highlight checklist items associated with initially "over-supporting" the product.
Mature product (ie. "version 4.5") should not surprise (in a bad way) customers; choosing Mature will highlight checklist items associated with reliable, stable deployment configurations.

| Product Maturity | Mature |
|---|---|

Mature or Immature?
Highlights certain items on checklist tab e.g. Immature product highlights SWAT team & phased roll-out.

4 Identify the Business Areas impacted by the product.
This product or feature will interact with or form part of the whole product for which of the following solutions?

| Business or Solution Area | Impact |
|---|---|

Notes

FIG. 2B

| | | |
|---|---|---|
| Enterprise Data Center Applications: SAN/iSC | | |
| Tier1 ie. Production, OLTP, Business Intelligence | Yes | Use "Storage SLA" tiers and/or additional EDCA sub-categories. |
| Tier2 ie. Collaborative & Reporting | Yes | |
| Tier3 ie. Development & Testing | Yes | |
| SAN (IP* and FC*) | No | |
| Windows Apps (Exchange*, SQL*) | Yes | Identify the business area/solution impacted by the technology; highlights certain items on checklist tab e.g. "Database" selection highlights "Benchmark SPC-1" item. |
| Databases (Oracle*) | Yes | |
| Business Apps (SAP) | Yes | |
| Enterprise Data & Storage Mgt. | Yes | |
| Disk-based Backup | No | |
| Disaster Recovery | Yes | |
| Regulatory Compliance | Yes | |
| Information Lifecycle Mgt. | No | |
| Enterprise File Services: NAS | No | |
| Windows File Services | No | |
| HPC (high bandwidth, cheap) | No | |
| Technical Apps (higher availability than HPC) | No | |
| Virtualization | Yes | |
| Content Delivery | No | |
| Internet Access and Security | No | (depends on Win authentication) |
| Application/Content Acceleration | No | |
| Streaming Services | No | |

| Ref# & Help | Phase: | | Required? | In-Plan? | Deliverable | Functional Responsibility | Core Team Owner | | Notes & Mitigation Plan (if required) | Priority |
|---|---|---|---|---|---|---|---|---|---|---|
| | | Whole Product Gap Analysis Checklist | | | | | | | | |
| | | SnapWidget Version 2.1 ("Mature"); phase 3; Owner: John Martin/TBD | | | | | | | | |
| 0.010 | 0/1 | Clarity of requirements and implementation | | | | | | | | |
| 0.020 | 0/1 | Product Requirements Document | Yes | No | PRD | Product Management | Venkat Lokki | i | Prioritization for switches is required | |
| 0.030 | 0/1 | Product Design Documentation | Yes | No | Available Implementation | Eng – Development | Sudheer Gole | i | | |
| 0.040 | 0/1 | Use Case scenarios | Yes | No | Use Case scenario(s) | Technical Marketing | Duncan Turner | i | | |
| 1.000 | 0/1 | Configurations | | | | | | | | |
| 1.010 | 0/1 | Supported configurations | Yes | Yes | Available Impl | | | i | Concerns about list inclusivity. | |
| 1.020 | 0/1 | Recommended configurations guide | Yes | No | Available Impl | Gap items (Required but not yet In Plan) are identified, and may be filtered. | | i | Info to come from Engineering & Prod Mgt | |
| 1.030 | 0/1 | "Sweet spot" configuration | No | | | | | | | |
| 1.040 | 0/1 | "Canned" configuration(s) | No | | | | | | | |
| 1.050 | 0/1 | List of possible configurations which ... | Yes | No | Available Implementation | Eng – Development | Sudheer Gole | i | Concerns about list inclusivity. | |
| 1.060 | 0/1 | Mechanism to detect/prevent/report u... | Yes | No | Available Implementation | Eng – Development | Sudheer Gole | i | May be a partial solution. May be some sort of audit service? | |
| 1.070 | 0/1 | File/net/cache/near store lines which must and must not support the product. | No | | | | | | | |
| 1.080 | 0/1 | Specific models (250, 980, etc) which must and must not support the product. | Yes | Yes | Available Implementation | Product Management | Venkat Lokki | i | List of switches | |
| 1.090 | 0/1 | ... and must not support the product. ...hich must be factory performed. ...are not compatible. | Yes | No | Available Implementation | Eng – Development | Sudheer Gole | i | Metrocluster conflicts | |
| 1.100 | 0/1 | | No | | | | | | | |
| 1.110 | 0/1 | | Yes | No | Available Implementation | Eng – Development | Sudheer Gole | i | | |
| 1.120 | 3 | | Yes | Yes | Beta/Draft Implementati... | PM Operations | | | | |
| 2.000 | 0/1 | Standards | | | | | | | | |
| 2.010 | 0/1 | List of required conformance Standards | Yes | Yes | Implementation Plan | Multiple Groups | Stephanie Parten | i | RoHS compliance for the card; FC over VI | |
| 2.020 | 0/1 | | No | | | | | | | |
| 2.030 | 0/1 | Specific loca... | No | | | | | | | |
| 2.040 | 0/1 | Specific part... | No | | | | | | | |
| 2.050 | 2 | Customer visible test plans & results | Yes | No | Implementation Plan | Eng. – QA | Bill Gilligan | i | Performance & distance results may be required. Performance | |
| 3.000 | 0/1 | Management Support | | | | | | | | |
| 3.010 | 0/1 | FilerView | Yes | No | Available Implementation | Eng – Development | Sudheer Gole | i | Should work, let's check .... | |
| 3.020 | 0/1 | DFM | Yes | No | Available Implementation | Eng – Development | Sudheer Gole | i | FC NIC configuration | |
| 3.030 | 0/1 | MMC (Microsoft Management Console) | No | | | | | | | |

Annotations:
- Highlighting (based on Config Tab selections) draw attention to specific items.
- The default Phase at which items are reviewed.
- Item help is available by hovering over Ref#

21 22 23 24 25 26 27 28 29

METHOD, MEDIUM, AND SYSTEM FOR WHOLE PRODUCT GAP ANALYSIS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

At least one embodiment of the present invention pertains to a whole product gap analysis tool, and more particularly, to a software-based tool to identify gaps in a business plan for providing a whole product.

BACKGROUND

In the design and manufacturing of products, particularly (though not exclusively) in high technology, it is important for product manufacturers to identify all of the elements of the "whole product". The "whole product" is a marketing term, which for purposes of this description is defined as a generic product augmented by everything that is needed for the customer to have a compelling reason to buy the generic product. The "generic product" is the actual item that is shipped to the customer, i.e., what the customer is primarily interested in acquiring. As illustrated in FIG. 1, the whole product typically augments the generic product with various types of services and information, such as procedures, product installation, customer training, technical support, and additional hardware and/or software, etc. To facilitate discussion, references to "the product" in this document shall be understood to refer to the generic product, unless stated otherwise.

An analysis which attempts to identify all of the elements of a whole product and any corresponding gaps in a company's business plan is called a whole product "gap analysis". In general, a whole product gap analysis is designed to answer the question, "What will it take to enable the target customer to be successful in their environment, throughout the cycle of choosing, deploying, operating and, where appropriate, upgrading a particular technology or product?" and to identify the specific deliverables, and their owners, required to bring about this outcome. Performing a thorough whole product gap analysis before a product is initially released can be critical to a company's success in the marketplace. Failure to identify key elements of the whole product and inadvertently omitting such items from the company's business plans can result in loss of customers, and therefore, loss of revenue.

Many product manufacturers have not yet even realized the importance of performing a whole product analysis. Those who have typically have done so only in a very unstructured way and to a very limited extent. For example, currently a limited gap analysis may be done by one or two people (e.g., a product manager and/or a marketing person) simply attempting to think of all of the required elements of the whole product and writing them down in some form of checklist or business plan. This approach makes it very easy to overlook important "deliverables", i.e., items that must be "delivered" or completed within the company at various stages in a product's lifecycle (from initial concept through delivery to the customer and beyond), in order to provide a whole product. Moreover, the current approach is time consuming, tedious and generally not consistently repeatable from product to product. Furthermore, it is sometimes difficult to identify which individuals within the company are or should be responsible for providing particular deliverables ("owners") during the development and manufacturing process. Additionally, it is often difficult to recognize and accommodate the various whole product interdependencies that may emerge during the evolution and extension of an integrated product portfolio.

SUMMARY OF THE INVENTION

The present invention includes a machine-implemented method, which includes indicating to a user items that are potentially required for providing a whole product associated with a generic product. The method further includes enabling the user to provide input specifying whether each of the items is required for providing the whole product, and in response to that input, for each item specified as required for providing the whole product, automatically identifying and indicating to the user a deliverable for the item and a person responsible for delivering the deliverable.

Another aspect of the invention is an apparatus which performs such a method.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIGS. 2A through 2E show various aspects of the user interface of the whole product gap analysis tool ("the tool");

DETAILED DESCRIPTION

Figure 1:
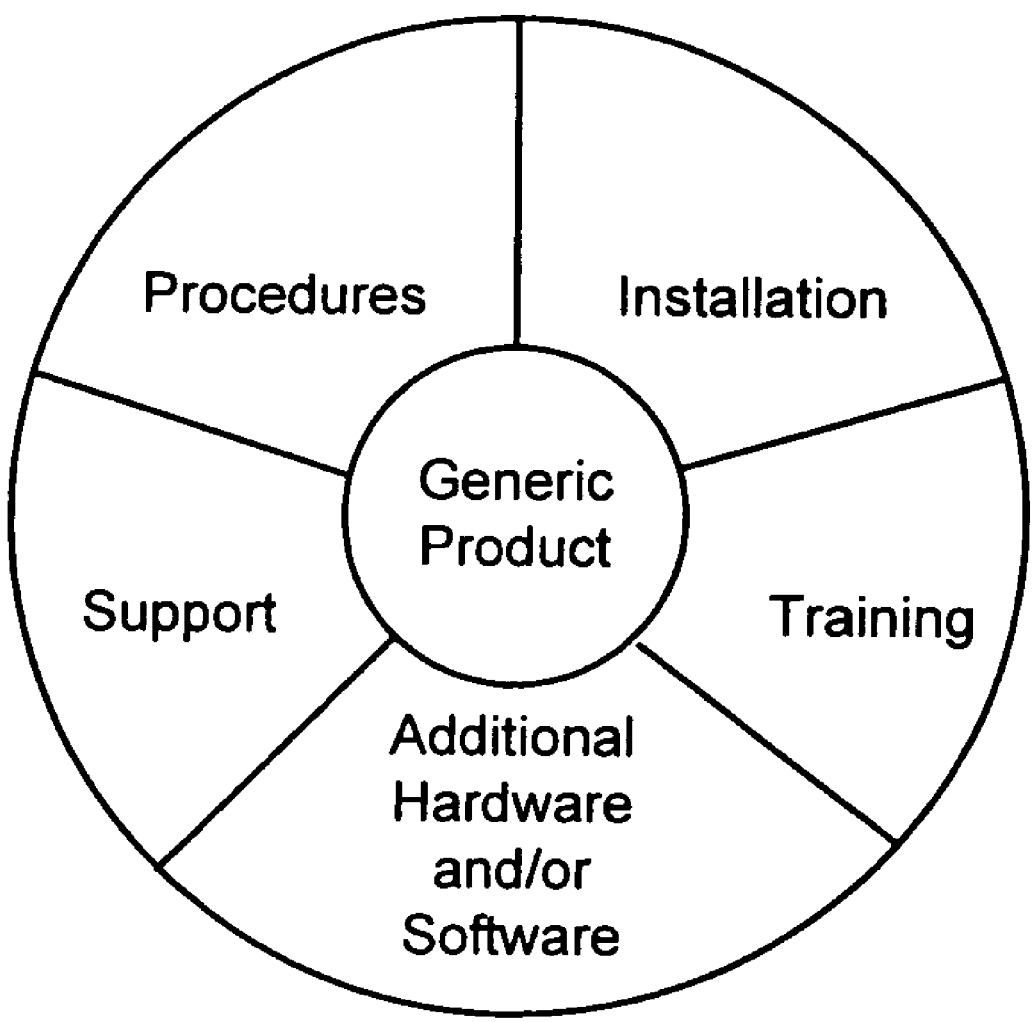
FIG. 1 illustrates an example of elements of a whole product.

A whole product gap analysis tool (hereinafter "the tool") is described. The tool is, in certain embodiments, a computer-implemented tool designed for use by a cross-functional team within a company, which enables the team to identify missing elements of the set of deliverables required for customer success for a particular product, along with organizational knowledge regarding default ownership and responsibility. It provides the opportunity to identify and assign necessary work that may otherwise be overlooked due to omissions in the product lifecycle process.

The gap analysis process employed by the tool includes a method for assessing a relatively large number of potentially necessary deliverables and dependencies in order to identify the subset of deliverables that are actually required for providing the whole product. Attention is drawn to certain highlighted items, based on associations configured within the tool.

The gap analysis process provides participants with an experiential learning opportunity to practice adopting the customer point of view, widening their perspective from developing and delivering product to facilitating customer success through the provision of whole products. The tool stores default functional responsibilities for various items, which resolves to specific team member ownership for each of the required deliverables. This functionality eases the assignment of tasks and deliverables within a cross-functional team in particular for deliverables with no obvious owner, and assists in the identification of additional extended team members when required.

In order to facilitate efficient and effective cross-functional dialog and decision-making, the tool maintains and employs information regarding:

prior utilization of a wide variety of deliverables and activities a simplified development/production lifecycle for each deliverable default functional ownership for each of the deliverables at each stage during development/production a classification of product technology areas, solutions and target markets/customers typical associations between specific deliverables and target customers, solutions or technologies typical or recommended product and support strategies relative to customer product expectations, product maturity and technology adoption, typical cross-functional team roles and responsibilities.

The tool distills this repository of organizational knowledge and presents it to a cross-functional team in a context-sensitive manner, based on team selections and inputs to the tool. The output of the tool includes a list of "gaps", i.e., deliverables that are required but not yet in the business plan (not "in plan") and their owners.

As will become even more apparent from the description which follows, the tool provides numerous advantages. For example, the tool assigns default responsibility for necessary deliverables and creates a shared understanding of responsibilities and expectations. The identification of specific functional owners for deliverables of different types and provisioning to the team of the default named responsible individuals for specific items is a significant advantage. This is particularly so in the context of organizations that are growing fast enough that many team participants are engaging in product development and go to market activities with little prior knowledge of de facto processes, roles and responsibilities.

In addition, the tool creates an opportunity to expose and dispel incorrect assumptions regarding what is "in plan", what is necessary for customer success, and who will be taking responsibility for each of the required deliverables and activities. The tool also provides an efficient and effective method to survey a wide range of requirements and procedural interfaces and to assess the need for each of them, and to capture additional, new requirements. Furthermore, the tool facilitates experiential learning by team members regarding the relationship between a business solution, technology and market maturity, customer environmental and service level agreement (SLA) requirements. In addition, the aggregate results of the gap analyses can provide critical decision support data for roadmap and strategic planning efforts.

The functionality of the tool will now be further described with reference to FIGS. 2A through 2E which show various aspects of the user interface of the tool. In certain embodiments the tool is implemented as a suitably-configured spreadsheet in Microsoft Excel or another spreadsheet software application. In other embodiments, however, the tool could be implemented in a different type of software implementation, such as a database application, or even purely in hardware.

Figure 2D:
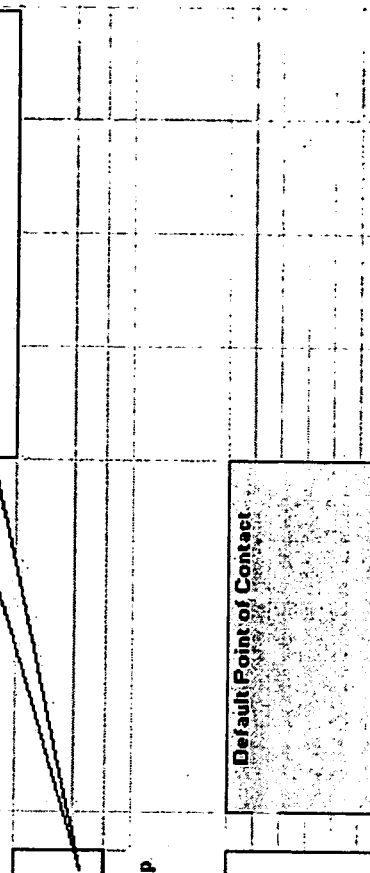

In the illustrated embodiment, the spreadsheet has two main pages, or "tabs", which are functionally linked through appropriate use of spreadsheet formulas and cell references. These tabs are referred to herein as the Configuration ("Config") tab and the Checklist tab. FIGS. 2A through 2D show portions of the Config tab and FIG. 2E shows a representative portion of the Checklist tab, for an illustrative implementation of the tool.

The purpose of the Config tab is to allow the user to input information about the product, solution and technology area, as well as the names of the core team members for the product. Information input on the Config tab is used by the tool to determine: 1) which particular items on the Checklist tab to highlight (to draw the user's attention) as particularly relevant to the product; 2) deliverables for required checklist items (e.g., specifications, plans or implementation); and 3) default owners for required checklist items/deliverables. Therefore, when using the tool, the user will initially go to the Config tab to input information.

As shown in FIGS. 2A through 2D, the Config tab prompts the user to input various information, either by typing the information into designated cells in the spreadsheet or by selecting from pull-down menus that are programmed into certain cells. For example, the user is prompted to specify the following information:

1) Name and version of the product (FIG. 2A)—The input to this field specifies the name and version of the product. As shown in the example of FIG. 2A, the user may enter "yes" or "no" for pre-specified product names/versions (e.g., "ONTAP Classic", "ONTAP NG", etc.). The user's input here causes certain items on the Checklist tab to be automatically highlighted.

2) Product phase (FIG. 2B)—The input to this field specifies the current phase (or next phase, depending on design preference) of the product in the product lifecycle. Each product phase can have a pre-assigned number, which the user can input or select from a menu, e.g., "0"=concept phase, "1"=requirements definition phase, "2"=planning phase, "3"=implementation phase, "4"=verification phase, "5"=launch phase, "6"=generally available phase (post launch), and "7"=data generally deployable phase (post launch). The input to this field determines the expected deliverable type (e.g., specification, planned, implementation) and the default owner (e.g., product management, development, services) for items on the Checklist tab.

3) Product maturity (FIG. 2B)—The input to this field specifies the maturity level of the product (e.g., mature or immature). The user's selection here causes certain items on the Checklist tab to be automatically highlighted.

4) Business or solution area(s) impacted by the product (FIG. 2B and continued onto FIG. 2C)—This section of the Config tab gives the user a list of possible choices of business or solution area(s) impacted by the product, any one or more of which can be selected. Selections here cause certain items on the Checklist tab to be automatically highlighted.

5) Whole product owner (FIG. 2D)—The input to this field specifies name of the person with overall responsibility for the whole product.

6) Core team representatives (FIG. 2D)—Input to this section of the Config tab establishes the names of the default owners for all deliverables that get listed on the Checklist tab. This section lists all of the potentially relevant job functions (categories) in the company and prompts the user to input the names of the core team representatives for each job function that is relevant to the product under consideration.

The user is prompted to provide the above-described inputs by appropriate prompts, which can be, for example, static text that is always displayed (e.g., table headings in a spreadsheet), or they can be dynamic prompts that appear and disappear on screen based on what the user is doing at a particular moment. Further, other types of prompts, such as audio prompts, can be used instead of or in addition to the above-described types of prompts, in embodiments of the invention.

Once all of the necessary information is input in the Config tab, the user will go to the Checklist tab, a representative portion of which is shown in FIG. 2E for an illustrative implementation of the tool. In the illustrated embodiment, the Checklist tab is set up as a table. Upon going to the Checklist tab, the user's attention will initially focus on the Items column 21 21, which includes a list of numerous items ("checklist items"), organized into various categories. This list is intended to be a list of all items that could potentially be required for a whole product.

A checklist item (i.e., an entry in the Items column 21) can be essentially anything that will cause a user to think about what is needed for a whole product, such as a noun or noun phrase, or a verb or verb phrase. Generally, a checklist item is a fairly general concept or subject area, whereas a deliverable is a specific thing that must be produced for a required checklist item. Many if not most of the checklist items will be specific to the company which is using the tool and its particular business area. Consequently, for any particular implementation of the tool, the content of the Items column 21 will depend on the type of business for which the particular implementation was created. For example, many if not all checklist items for a company which produces network storage systems may be different from the checklist items for a company which produces word processing software. However, some checklist items may be applicable to various different types of businesses.

Certain checklist items may be automatically highlighted on the Checklist tab, depending on the information that the user has input on the Config tab and/or the Checklist tab, to indicate to the user that these items are likely required for the whole product. For example, if "immature" is selected for Product maturity on the Config tab, the following checklist items on the Checklist tab (discussed below) may be highlighted:

FAQs from Engineering
Installation & Integration services
Evaluation license?
Mutual incompatibilities between licensed products In contrast, if "mature" is selected for Product maturity, the following checklist items on the Checklist tab may be highlighted:

Mechanism to detect/prevent/report unsupported configuration
Availability requirements for planned outages
Sizing guidelines
ASUP—autosupport enhancements, tools, products
Architectural & Design services
Specific Internationalization issues
Additional Localization issues The highlighting is intended to draw the user's attention to those items and indicates that such items are particularly relevant (i.e., likely to be required) to the whole product in view of the information input by the user. Therefore, associated with certain items in the Items column 21 is logic that determines the conditions under which the item is highlighted. In a spreadsheet based embodiment, this logic may be embedded within the individual cells in the Items column 21.

To the right of the Items column 21, the Checklist tab also includes a Required column 22, an In-Plan column 23, a Deliverable column 24, a Functional Responsibility column 25, a Core Team Owner column 26, a Gap column 27, a Notes and Mitigation Plan column 28, and a Priority column 29. For each checklist item, the Required column 22 includes a binary input value, e.g., "yes" or "no", which the user specifies to indicate whether or not the checklist item is required for the whole product. If the user specifies "yes" (i.e., the item is required) for a particular checklist item, the tool automatically causes the Deliverable, Functional Responsibility, and Core Team Owner (name of the owner of the deliverable) columns to be populated for that item. In addition, for certain checklist items the user's input in the Required column 22 will determine whether or not certain other (related) checklist items are highlighted. The user can also input notes and comments in the "Notes and Mitigation Plan (if required)" column 28.

The output value (character string) populated in the Deliverable column 24 for any checklist item is the specific thing that must be created/provided/completed by someone in order for that checklist item to be considered complete. Examples of deliverables that may be populated in the Deliverable column are: "product requirements document (PRD)", "use case scenarios", "functional specification", "plan", "contract", and "available implementation". Of course, many other types of deliverables can be envisioned.

The output value populated in the Functional Responsibility column 25 for any checklist item is the department or group responsible for that checklist item, such as "Engineering—Development", "Engineering—QA" or "Product Management". The particular output value in this column generally depends on the particular checklist item.

In at least one embodiment of the invention, the output Deliverable and Functional Responsibility values for any particular checklist item are both a function of the product lifecycle phase input by the user on section 2 of the Config tab (FIG. 2B) and may be determined by a simple lookup. The Core Team Owner is indirectly also a function of the lifecycle phase, i.e., the value populated in the Core Team Owner column 26 for any checklist item is the name of the core team member that was input on section 6 the Config tab (FIG. 2D) for the functional responsibility for that checklist item, as dictated by the specified lifecycle phase.

For every line item in the checklist, a Deliverable value and Functional Responsibility value are pre-specified (by, for example, the person who creates the particular implementation of the tool) for each phase in the product Recycle. In a spreadsheet based embodiment, all of these possible values can be specified in a table implemented in hidden columns (although they can be made visible, if desired), and these values can be automatically populated into the Deliverable and Functional Responsibility columns 24 and 25, respectively, where and when appropriate, by performing simple lookups to that table. In a spreadsheet based embodiment, the mapping of checklist items in the Items column 21 (FIG. 2E) to specific values for Deliverable and Functional Responsibility can be done by simple lookup, as specified by information embedded in the cells of those columns.

As a more specific example, for a sample checklist item "Go To Market deliverables, plans, process", deliverables and functional responsibilities might be specified for this item in a hidden table in a spreadsheet as shown in Table 1.

TABLE 1

| Lifecycle Phase | Deliverable | Functional Responsibility |
| --- | --- | --- |
| 0 | MRD | Product Management |
| 1 | GTM Initialization Form | Product Management |
| 2 | Plans & Deliverables | Product Marketing |
| 3 | Demand Generation Activity | Product Marketing |
| 4 | Demand Generation Activity | Product Marketing |
| 5 | Demand Generation Activity | Product Marketing |
| 6 | Demand Generation Activity | Product Marketing |
| 7 | Demand Generation Activity | Product Marketing |

These values may be different for different checklist items. For example, for a checklist item "Performance modeling tools", deliverables and functional responsibilities might be specified for this item as shown in Table 2.

TABLE 2

| Lifecycle Phase | Deliverable | Functional Responsibility |
| --- | --- | --- |
| 0 | Business Justification | Product Management |
| 1 | Specification | Product Management |
| 2 | Implementation Plan | Performance Engineering |
| 3 | Available Implementation | Performance Engineering |
| 4 | Available Implementation | Performance Engineering |
| 5 | Available Implementation | Performance Engineering |
| 6 | Available Implementation | Performance Engineering |
| 7 | Available Implementation | Performance Engineering |

To determine the Core Team Owner value for this checklist item, assuming for example that the lifecycle phase input by the user is "2" on the Config tab, the tool simply looks up the functional responsibility value for phase 2 in this table, which is "Product Marketing". The tool then looks up the core team owner name that was input for "Product Marketing" in the Config tab, to determine the value (name) that should appear in the Core Team Owner column. If no name was specified, a default name such as the whole product owner (specified on the Config tab) is used.

Immediately to the right of the Required column 22 is the In-Plan column 23. For each checklist item, the In-Plan column 23 receives a binary input value or selection, e.g., "yes" or "no", which the user specifies to indicate whether the checklist item is currently in the business plan for the product. If the user indicates "no" in this column for any item (i.e., the item currently is not in plan), then the Gap column 27 is automatically populated with an appropriate alert symbol (e.g., "!") for that item, to remind the user of this fact (i.e., that the item is currently a "gap" in the whole product). In response to an appropriate user input, such as clicking a designated button or selecting a menu item, the list (e.g., the entire Checklist tab) will be filtered to display only those line items that are indicated as required but not "in plan" (i.e., just the gaps).

Additionally, in the Priority column 29 the user can enter a numerical value to specify a relative priority level for each checklist item that is required. In response to an appropriate user input, the list (or filtered list) can then be sorted to rank the displayed items by their assigned priorities.

Figure 3:
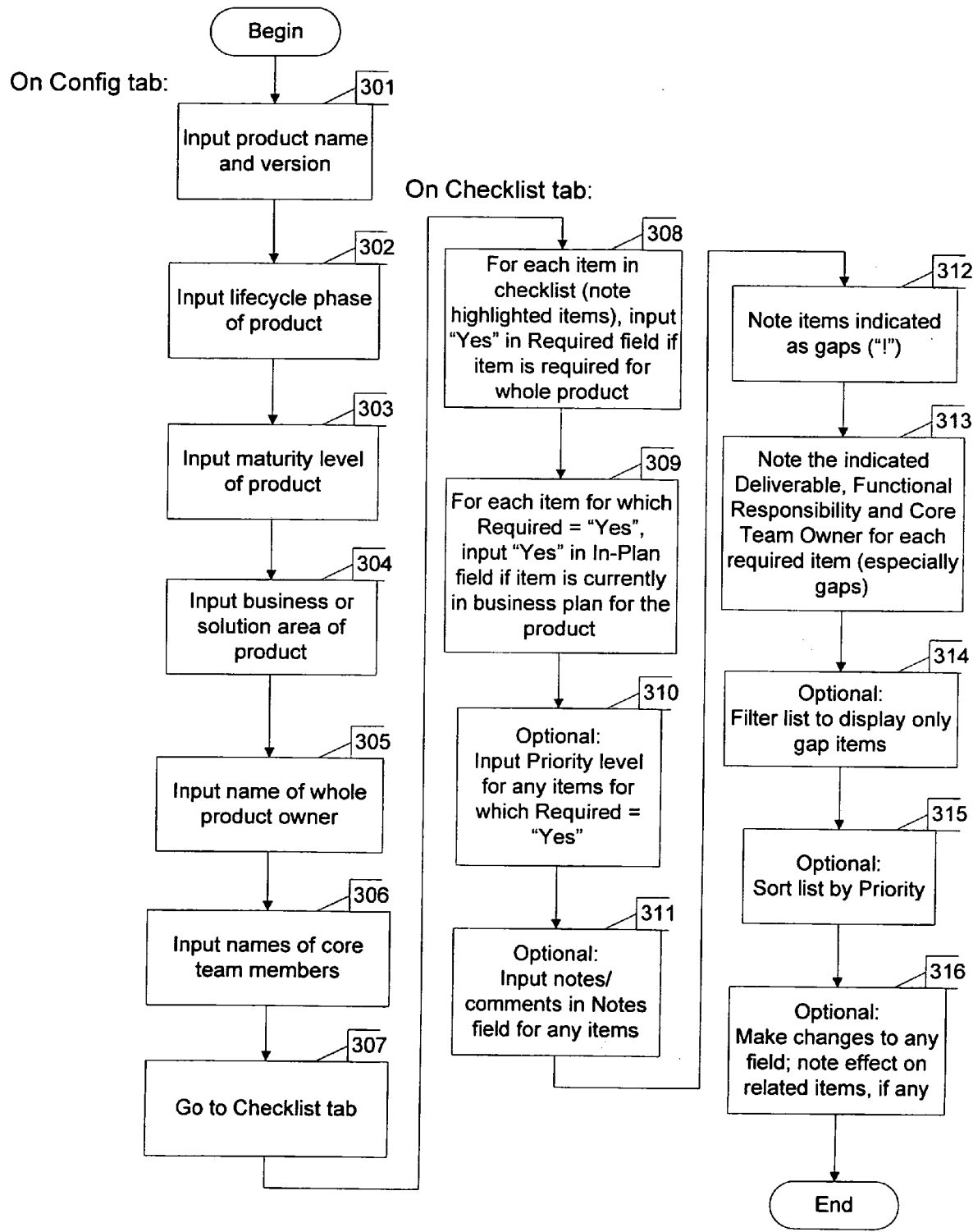
FIG. 3 shows an example of the process for using the tool.

FIG. 3 shows an example of the process for using the tool. The tool is preferably used in the context of a meeting (e.g., a "gap analysis" meeting) of the core team members, so as to promote discussion and exchange of ideas. Therefore, the core team is preferably identified before the tool is used, based on the business area to which the product relates. To use the tool, the user (typically one of the core team members) generally follows the following process. Note that it is intended that ideas from all team members be solicited and considered at each stage of this process.

Initially, on the Config tab (FIGS. 2A through 2D), the user inputs to product name and version at 301. Note that the term "input" as used herein can include the user selecting from one or more pre-specified options (e.g., menu items). The user then inputs the lifecycle phase of the product at 302 and the maturity level of the product at 303. At 304 the user inputs the business or solution area of the product. The user then inputs the name of the whole product owner at 305 and the names of the core team members at 306. At this point, the inputting of data on the Config tab is complete, so at 307 the user then goes to (activates) the Checklist tab (FIG. 2E).

Some of the checklist items in the Items column 21 may be highlighted, depending on the information input on the Config tab. Highlighting of items can also be affected by information input on the Checklist tab, as described below. All of the meeting participants (e.g., all core team members, preferably) then together review all of the checklist items on the Checklist tab (the Items column 21) to determine which items are required for the whole product. At this point (at 308), therefore, the user (in response to comments from all team members) inputs "yes" in the Required column for each item which is deemed to be required for the whole product. At 309 (again, in response to comments from all team members) the user inputs "yes" in the In-plan column for each required item (i.e., Required="yes") that is currently in the business plan for the product. In both be Required column and the In plan column, the default value (the value used if the user provides no input) is "no".

When any item is indicated as required, the tool responds by automatically causing the default deliverable, functional responsibility, and core team owner to be indicated next to that item on the Checklist tab. Similarly, for any item which is indicated as required but is not indicated as being in plan (i.e., the input value is not "yes" in the In-Plan column 23), the tool responds by automatically causing an alert symbol to appear in the Gap column 27 next to that item on the Checklist tab.

Next, at 310 the user Optionally inputs a priority level in the Priority column 29 for any of the required items (e.g., "1" to indicate low priority, "5" to indicate high-priority, or any number in between). At any time (311) during this process, the user optionally inputs notes or comments for any items in the "Notes & Mitigation Plan (if required)" column 28.

At 312 the entire team notes any gaps, i.e., checklist items that are required but not currently in plan; such items are indicated by the alert symbol ("!") in the Gap column 27. At 313 the team notes the indicated deliverable, functional responsibility and core team owner for each required item, particularly the gaps, so that appropriate action can be assigned to the appropriate individuals, to eliminate those gaps.

At 314 the user optionally can filter the checklist to display only the gaps and/or sort the list by Priority at 315. In addition, at any point (316) during this process the user can make changes to any input field. For example, the team can decide to override the tool's indication of the core team owner for a particular required checklist item, by simply typing in a new name in the Core Team Owner column 26 for that item. Certain changes may affect the output of the tool, which occurs immediately. For example, whether a particular checklist item is specified as required or not may determine whether another (related) item in the checklist gets highlighted. That is, if a particular item is required, it may make it more likely that another particular item is also required the whole product. The logic which determines the highlighting of checklist items is specific to the particular business of the company and is embedded in the Checklist tab. And, as already noted, changing the value in the Required column 22 will determine whether any output information appears in the Deliverable column 24, Functional Responsibility column 25 or Core Team Owner column 26. Similarly, changing the value in the In-Plan column 23 will affect the output in the Gap column 27 if the item has been specified by the user as required.

Note that the particular sequence in which information is input in the above-described process is not critical. Therefore, the sequence of operations described above can be different in various embodiments and usage scenarios of the tool.

It can be seen, therefore, that the tool provides users with an extensive checklist of items that may be required to provide a whole product, automatically identifies the whole product "gaps" in a prioritized way, and automatically identifies the corresponding deliverables and their owners for required items.

Figure 4:
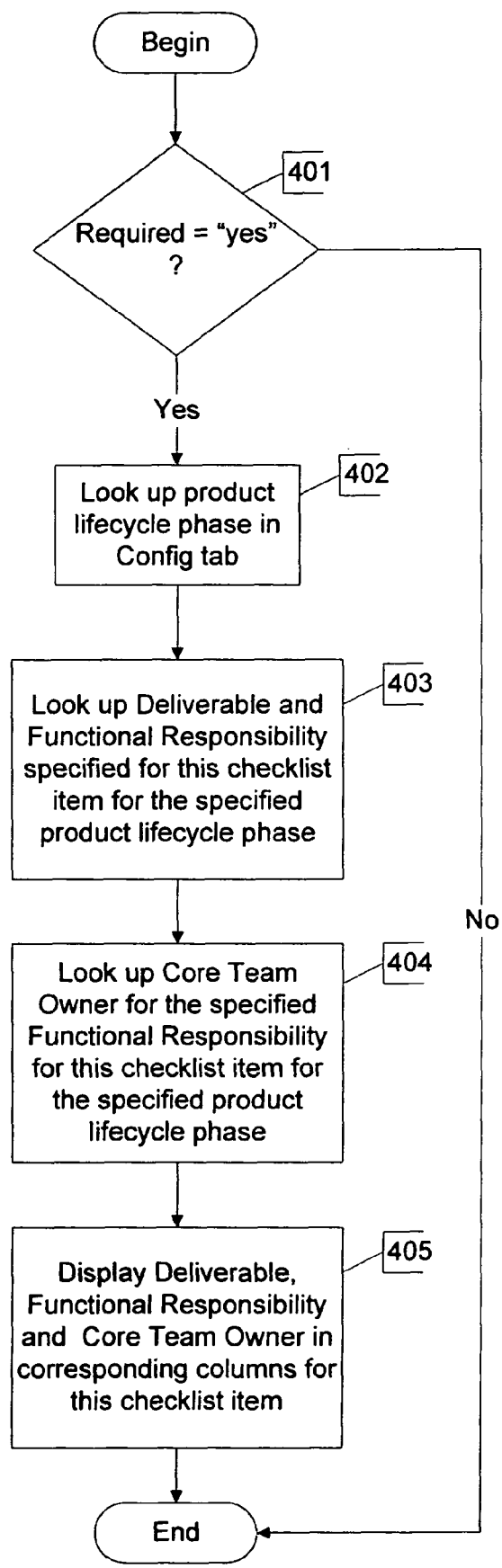
FIG. 4 shows an example of the process by which the tool determines and outputs values for Deliverable, Functional Responsibility, and Core Team Owner in the Checklist tab.

FIG. 4 shows an example of the process by which the tool determines and outputs values for Deliverable, Functional Responsibility, and Core Team Owner in the Checklist tab (FIG. 2D), for a particular checklist item. Initially, the tool determines whether the value in the Required column 22 is set to "yes" for that item. If not, the process ends, i.e., the Deliverable, Functional Responsibility, and Core Team Owner are not applicable to this checklist item. If the item is indicated as required, then the process proceeds to 402, at which the tool looks up the product lifecycle phase that was input by the user on the Config tab (FIG. 2B). Next, at 403 the tool looks up the deliverable and functional responsibility specified for this checklist item for the specified product lifecycle phase. As indicated above, these values may be specified in a table, which in a spreadsheet implementation may be contained in one or more hidden columns. At 404, the tool then looks up, in the Config tab, the core team owner for the specified functional responsibility (determined at 403) for the specified product lifecycle phase (determined in 402) for this checklist item. At 405 the looked up deliverable, functional responsibility and core team owner values are then displayed in their respective columns 24, 25 and 26 for this checklist item in the Checklist tab (FIG. 2E).

Figure 5:
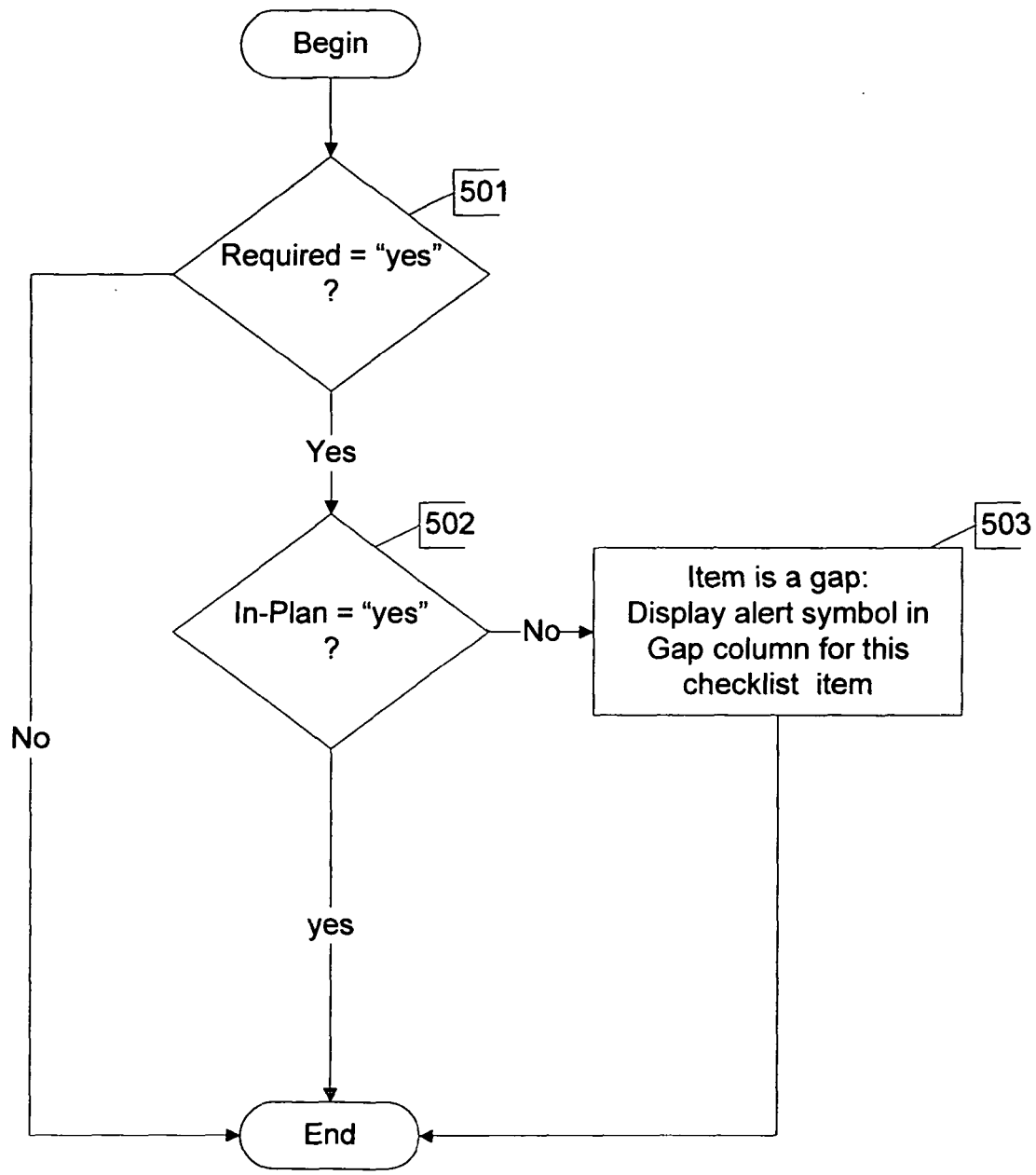
FIG. 5 shows an example of the process by which the tool identifies items which are gaps in the whole product analysis.

FIG. 5 shows an example of the process by which the tool identifies whether a particular item in the checklist is a gap in the whole product analysis. The illustrated process is performed for each item in the checklist. Initially, the tool determines whether the value in the Required column 22 is set to "yes" for the item. If not, the process ends, i.e., if the item is not required for the whole product, then by definition it is not a gap. If the item is indicated as required, then at 502 the tool determines whether the item is indicated "in plan" (i.e., whether the input is "yes" in the In-Plan column 23). If the item is indicated as in plan, the process ends, i.e., by definition the item is not a gap. If, however, the item is indicated as required (501) but not in plan (502), then the item is a gap in the whole product analysis, in which case at 503 the tool displays an alert symbol ("!") in the Gap column 27, for this item on the Checklist tab. As noted above, the checklist can be filtered display only those items which are determined to be gaps.

Figure 6:
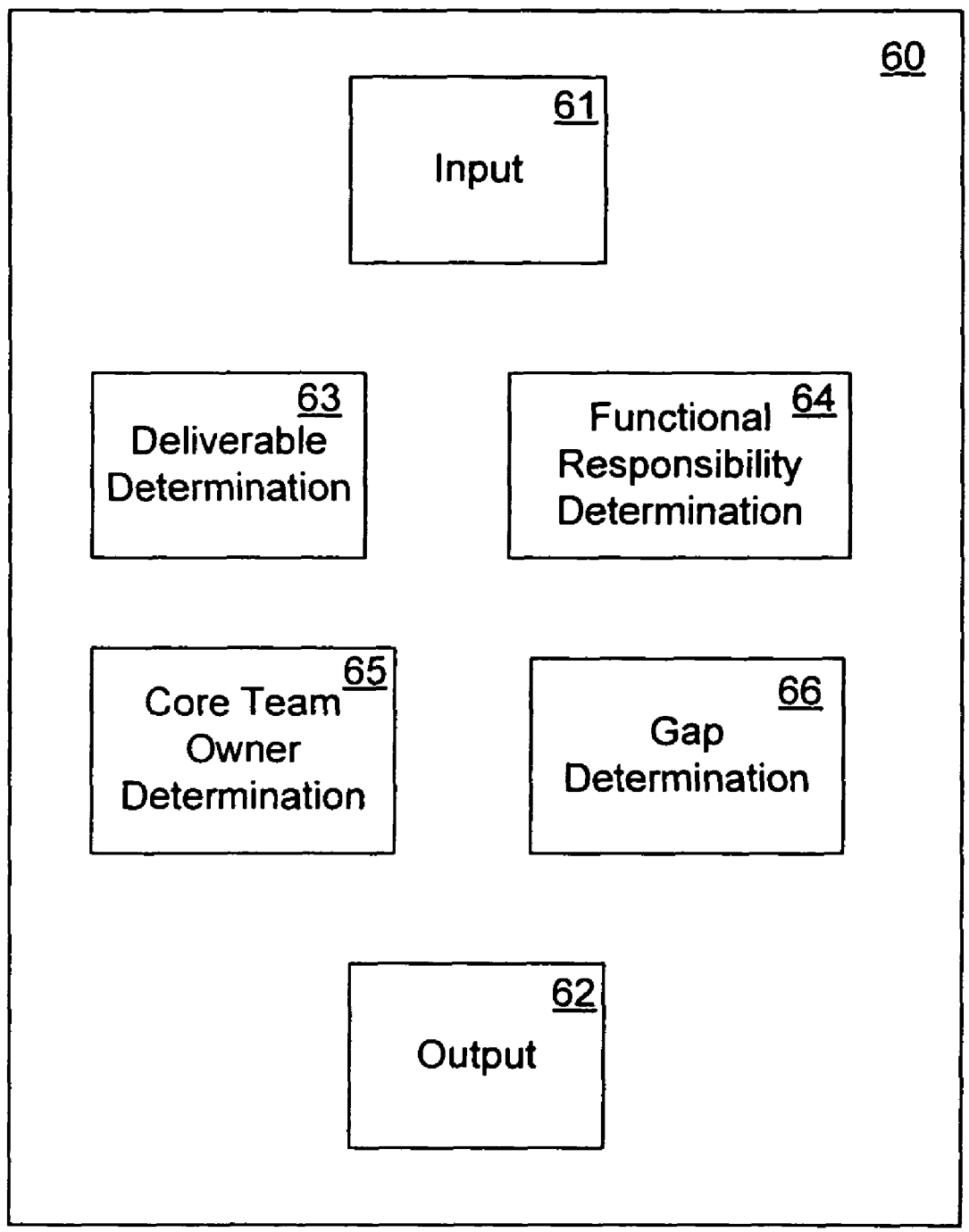
FIG. 6 is a block diagram of the functional elements of the tool, according to an embodiment of the invention.

FIG. 6 is a block diagram of the functional elements of the tool, according to an embodiment of the invention. In certain embodiments, as noted above, the tool 620 is implemented in software, although not necessarily so. For example, in certain embodiments the tool 20 is implemented in the form of an appropriately-configured spreadsheet in a spreadsheet software application, such as Microsoft Excel. Note that in other embodiments, however, the tool 60 or certain portions of the tool could instead be implemented in another software application or applications, or purely in hardware, for example in application-specific integrated circuits (ASICs), programmable logic devices (PLDs), or the like.

In the illustrated embodiment, the tool 60 includes several functional modules, i.e., an input module 61, an output module 62, a Deliverable determination module 63, a Functional Responsibility determination module 64, a Core Team Owner determination module 65 and a Gap determination module 66. As noted above, each of these modules can be implemented in software, purely in hardwired circuitry, or in a combination thereof. The input module 61 is responsible for receiving and processing inputs from a user. The Deliverable determination module 23 is responsible for identifying, based on the user inputs, the deliverables for the checklist items which the user has indicated as required. The Functional Responsibility determination module 24 is responsible for identifying, based on the user inputs, the functional responsibility, i.e., the job function responsible for delivering each of those deliverables. The Core Team Owner determination module 24 is responsible for identifying, based on the user inputs, the owner (person responsible) for delivering each of those deliverables. The output module 22 is responsible for outputting to the user the results of these determinations.

Note that the tool 60 can also include other modules, not shown, to implement other functions described above. Further, in certain embodiments, two or more of the aforementioned functional modules can be combined into a single module. For example, the input module 21 and output module 22 could be combined with each other, or they could be combined with and/or distributed amongst the other modules. Further, in certain embodiments the functionality of the modules shown in FIG. 6 could alternatively be separated and distributed amongst a greater number of functional modules. Thus, the tool 60 is not limited to the architecture of FIG. 6.

Figure 7:
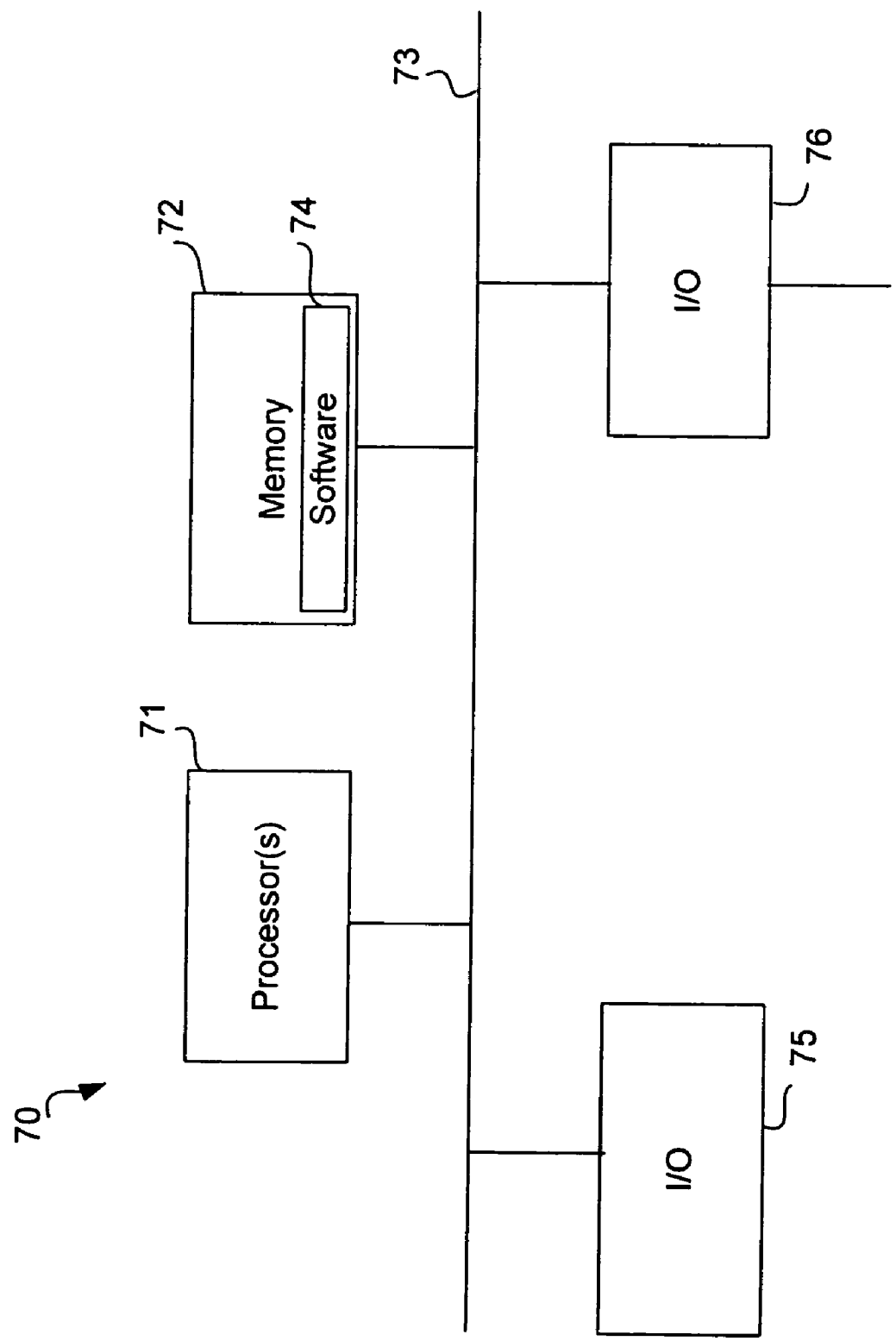
FIG. 7 is a block diagram of a computer system in which the tool can execute.

FIG. 7 is a high-level block diagram of a computer system on which the tool can execute. The computer system 70 includes one or more processors 71 and memory 72 coupled to a bus system 73. The bus system 73 shown in FIG. 7 is an abstraction that represents any one or more separate physical buses and/or point-to-point connections, connected by appropriate bridges, adapters and/or controllers. The bus system 73, therefore, may include, for example, a system bus, a form of Peripheral Component Interconnect (PCI) bus, HyperTransport or industry standard architecture (ISA) bus, small computer system interface (SCSI) bus, universal serial bus (USB), Inter-IC (I2C) bus, or Institute of Electrical and Electronics Engineers (IEEE) standard 1394 bus (sometimes referred to as "Firewire").

The processors 71 are the central processing units (CPUs) of the computer system 70 and, thus, control its overall operation. In certain embodiments, the processors 71 accomplish this by executing software stored in memory 72. Such processor 71 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 72 can store software which embodies or implements the whole product gap analysis tool described above. Memory 72 represents the main memory of the computer system 70 as well as any secondary information storage facilities, such as disk drives, tape drives, etc. Hence, memory 72 may represent and/or include any of various forms of random access memory (RAM), read-only memory (ROM), flash memory, magnetic disks, optical disks, etc.

Also connected to the processors 71 through the bus system 73 are various input/output (I/O) devices 75, 76, which can include, for example, a display device, keyboard, mouse, microphone, audio speaker, network adapter, etc.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, hardwired circuitry, programmable circuitry, software, or any combination thereof.

Thus, a whole product gap analysis tool has been described. Note that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A machine-implemented method comprising:
   indicating to a user a plurality of items with an indication that the plurality of items are potentially required for providing a whole product associated with a generic product;
   receiving, from the user, input specifying that one or more items in the plurality of items is required for providing the whole product;
   in response to receiving said input, for each of the one or more items specified as required for providing the whole product, automatically identifying and indicating to the user a deliverable for the item and a person responsible for delivering the deliverable;
   receiving input specifying that one or more items in the one or more items specified as required for providing the whole product are not currently in a business plan associated with the generic product; and
   filtering, by a computer processor, the plurality of items so as to indicate to the user only those items specified by the user as required for providing the whole product but not currently in the business plan associated with the generic product.

2. A method as recited in claim 1, wherein said filtering is in response to a user input.

3. A method as recited in claim 1, further comprising:
   ordering the indicated items in an output to the user according to a specified prioritization.

4. A method as recited in claim 1, further comprising:
   receiving input from the user specifying information associated with the generic product.

5. A method as recited in claim 4, wherein the input information associated with the generic product comprises a phase in a lifecycle of the generic product.

6. A method as recited in claim 5, wherein automatically identifying the deliverable associated with the item is done as a function of the specified phase in the lifecycle of the generic product.

7. A method as recited in claim 5, wherein automatically identifying the person responsible for delivering the deliverable is done as a function of the specified phase in the lifecycle of the generic product.

8. A method as recited in claim 7, wherein:
   the input information associated with the generic product further comprises a responsible person for each of a plurality of different business functions; and
   automatically identifying the person responsible for delivering the deliverable is done as a function of a person specified as responsible for a business function associated with the item.

9. A method as recited in claim 8, wherein the person specified as responsible for the business function associated with the item is a function of the specified phase in the lifecycle of the generic product.

10. A method as recited in claim 1, wherein indicating to a user the plurality of items that are potentially required for providing the whole product comprises:
    using specified logic to select particular items to highlight, said logic being a function of at least a portion of the input information associated with the generic product; and
    highlighting the selected items to indicate that the selected items may be particularly relevant to the whole product.

11. A method as recited in claim 10, wherein the input information associated with the generic product comprises a maturity level of the generic product, and wherein certain items in the list are selected to be highlighted according to the specified maturity level of the generic product.

12. A method as recited in claim 10, wherein the input information associated with the generic product comprises a name and version or technology type of the generic product, and wherein certain items in the list are selected to be highlighted according to the specified name and version or technology type of the generic product.

13. A method as recited in claim 10, wherein the input information associated with the generic product comprises a business or solution area of the generic product, and wherein certain items in the list are selected to be highlighted according to the specified business or solution area of the generic product.

14. A computer-implemented method of enabling a user to identify aspects of a whole product associated with a generic product, the method comprising:
    enabling a user to input information associated with the generic product;
    receiving user input specifying the information associated with the generic product;
    displaying to the user a list of items with an indication that the plurality of items are potentially required for providing the whole product;

receiving, from the user, input specifying that one or more items in the list of items required for providing the whole product;

for each of the one or more items in the list of items specified by the user as required for providing the whole product, automatically identifying a deliverable associated with the item based on at least a portion of the input information associated with the generic product, and displaying an indication of the deliverable in association with the item, and automatically identifying a person responsible for delivering the deliverable and displaying an indication of the person in association with the item and the deliverable;

receiving input specifying that one or more items in the one or more items specified as required for providing the whole product are not currently in a business plan associated with the generic product; and filtering, by a computer processor, the displayed list of items so as to display a subset of the list comprising only those items specified by the user as required for providing the whole product but not currently in the business plan.

15. A method as recited in claim 14, wherein displaying to the user the list of items which are potentially required for providing the whole product comprises:

using specified logic to select particular items in the list to highlight, said logic being a function of at least a portion of the input information associated with the generic product; and highlighting the selected items to indicate that the selected items may be particularly relevant to the generic product.

16. A method as recited in claim 14, wherein:

the input information associated with the generic product comprises a phase in a lifecycle of the generic product;

automatically identifying the deliverable associated with the item is done as a function of the specified phase in the lifecycle of the generic product; and automatically identifying the person responsible for delivering the deliverable is done as a function of the specified phase in the lifecycle of the generic product.

17. A non-transitory machine-readable storage medium storing instructions which, when executed in a processing system, cause the processing system to perform a process comprising:

receiving input from a user specifying information associated with a generic product;

indicating to the user a plurality of items with an indication that the plurality of items are potentially required for providing a whole product associated with the generic product;

receiving input specifying that one or more items in the plurality of items is required for providing the whole product;

for each of the one or more items specified as required for providing the whole product, automatically identifying and indicating to the user a deliverable associated with the item based on at least a portion of the input information associated with the generic product, and automatically identifying and indicating to the user a person responsible for delivering the deliverable;

receiving input specifying that one or more items in the one or more items specified as required for providing the whole product are not currently in a business plan associated with the generic product; and filtering the plurality of items so as to indicate to the user only those items specified by the user as required for providing the whole product but not currently in the business plan associated with the generic product.

18. A machine-readable storage medium as recited in claim 17, said process further comprising:

ordering the filtered list so as to display the items in said portion according to a specified prioritization.

19. A machine-readable storage medium as recited in claim 17, wherein displaying to the user the list of items which are potentially required for providing the whole product comprises:

using specified logic to select particular items in the list to highlight, said logic being a function of at least a portion of the input information associated with the generic product; and highlighting the selected items to indicate that the selected items may be particularly relevant to the whole product.

20. A machine-readable storage medium as recited in claim 19, wherein the input information associated with the generic product comprises a maturity level of the generic product, and wherein certain items in the list are selected to be highlighted according to the specified maturity level of the generic product.

21. A machine-readable storage medium as recited in claim 19, wherein the input information associated with the generic product comprises a name and version or technology type of the generic product, and wherein certain items in the list are selected to be highlighted according to the specified name and version or technology type of the generic product.

22. A machine-readable storage medium as recited in claim 17, wherein the input information associated with the generic product comprises a business or solution area of the generic product, and wherein certain items in the list are selected to be highlighted according to the specified business or solution area of the generic product.

23. A machine-readable storage medium as recited in claim 17, wherein the input information associated with the generic product comprises a phase in a lifecycle of the generic product.

24. A machine-readable storage medium as recited in claim 23, wherein automatically identifying the deliverable associated with the item is done as a function of the specified phase in the lifecycle of the generic product.

25. A machine-readable storage medium as recited in claim 23, wherein automatically identifying the person responsible for delivering the deliverable is done as a function of the specified phase in the lifecycle of the generic product.

26. A machine-readable storage medium as recited in claim 25, wherein:

the input information associated with the generic product further comprises a responsible person for each of a plurality of different business functions; and automatically identifying the person responsible for delivering the deliverable is done as a function of a person specified as responsible for a business function associated with the item.

27. A machine-readable storage medium as recited in claim 26, wherein the person specified as responsible for the business function associated with the item is a function of the specified phase in the lifecycle of the generic product.

28. A computer system comprising:
an input device;
an output device;
a processor coupled to the input device and the output device and configured to execute a process which includes:
  indicating to a user, via the output device, a plurality of items with an indication that the plurality of items are potentially required for providing a whole product associated with a generic product;
  receiving from the user, via the input device, user input specifying that one or more items in the plurality of items are required for providing the whole product;
  in response to receiving said user input, for each of the one or more items specified as required for providing the whole product, automatically identifying and indicating to the user, via the output device, a deliverable for the item and a person responsible for delivering the deliverable;
  receiving, from the user, user input specifying that one or more items in the one or more items specified as required for providing the whole product are not currently in a business plan associated with the generic product; and
  filtering the plurality of items so as to indicate to the user only those items specified by the user as required for providing the whole product but not currently in the business plan associated with the generic product.

29. A computer system as recited in claim 28, wherein said indicating to the user comprises:
  using specified logic to select particular items to highlight, said logic being a function of at least a portion of the input information associated with the generic product; and
  highlighting the selected items to indicate that the selected items may be particularly relevant to the whole product.

\* \* \* \* \*